United States Patent
Akiyama

(10) Patent No.: US 6,764,210 B2
(45) Date of Patent: Jul. 20, 2004

(54) STOP LAMP FOR VEHICLES

(75) Inventor: Kiyohiro Akiyama, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/196,547

(22) Filed: Jul. 17, 2002

(65) Prior Publication Data

US 2003/0016543 A1 Jan. 23, 2003

(30) Foreign Application Priority Data

Jul. 19, 2001 (JP) ........................................ 2001-220539

(51) Int. Cl.[7] ................................................ B60Q 1/26
(52) U.S. Cl. ........................ 362/541; 362/499; 362/503; 340/479; 340/815.45
(58) Field of Search ................................ 340/464, 468, 340/475, 479, 815.45; 362/249, 800, 541, 542, 499, 503

(56) References Cited

U.S. PATENT DOCUMENTS

| | | | | |
|---|---|---|---|---|
| 4,914,731 A | * | 4/1990 | Chen | ..................... 340/815.45 |
| 4,935,722 A | | 6/1990 | Pollack | |
| 5,062,027 A | | 10/1991 | Machida et al. | |
| 5,162,696 A | * | 11/1992 | Goodrich | ..................... 313/511 |
| 5,241,457 A | | 8/1993 | Sasajima et al. | |
| 6,097,549 A | | 8/2000 | Jenkins et al. | |
| 6,299,337 B1 | * | 10/2001 | Bachl et al. | ................. 362/545 |
| 6,371,637 B1 | * | 4/2002 | Atchinson et al. | ........... 362/555 |
| 6,422,716 B2 | * | 7/2002 | Henrici et al. | ............... 362/249 |
| 6,520,669 B1 | * | 2/2003 | Chen et al. | .................. 362/545 |
| 2003/0112627 A1 | * | 6/2003 | Deese | ......................... 362/249 |

FOREIGN PATENT DOCUMENTS

| | | |
|---|---|---|
| FR | 2 738 194 A3 | 3/1997 |
| FR | 2 779 508 A1 | 12/1999 |
| JP | 63-52204 | 4/1988 |
| JP | 4-95843 | 8/1992 |
| JP | 2000-100219 | 4/2000 |
| JP | 2001-283612 | 10/2001 |

* cited by examiner

Primary Examiner—John Anthony Ward
(74) Attorney, Agent, or Firm—Foley & Lardner LLP

(57) ABSTRACT

A stop lamp for a vehicle comprises a substrate, a plurality of LED chips, at least one connecting wire and a cover made. The substrate has a plurality of openings and a surface that faces towards a panel of a rear window of the vehicle. The substrate has an arrangement for fixing to an inner surface of the panel. One LED chip is arranged in each opening on the substrate. The connecting wires are arranged on the substrate and electrically connect the LED chips to one another and to a voltage source. The cover is transparent and provided to protect the LED chips.

10 Claims, 4 Drawing Sheets

STOP LAMP FOR VEHICLES

FIELD OF THE INVENTION

The present invention relates to a stop lamp which is referred to as "high mount stop lamp" and arranged on an inner surface of a panel of a rear window of vehicles.

BACKGROUND OF THE INVENTION

A conventional stop lamp has been disclosed in, for example, U.S. Pat. No. 5,241,457. This stop lamp comprises a substrate, a plurality of LED chips, connection wires, a transparent resin member, a transparent resin molded member, and a lens. The LED chips function as a light source. The LED chips are arranged in one or two rows so as to be better viewed from a rear side of a vehicle.

SUMMARY OF THE INVENTION

It is an object of the present invention to provide an automotive stop lamp which has wide light emitting area, which ensures rear visibility and which requires fewer parts.

The stop lamp according to the present invention comprises a substrate having a plurality of openings, an arrangement for fixing to an inner surface of a panel of a rear window of the vehicle, and a surface that faces towards the panel, a plurality of LED chips arranged in an array on the surface of the substrate, at least one connecting wire arranged on the substrate and which electrically connects the LED chips to one another, and a cover made of transparent synthetic resin and which covers the LED chips.

According to the above aspect, therefore, since a plurality of LED chips are arranged in an array, the light emitting area of the stop lamp is larger than that of the conventional automotive stop lamp which has the plurality of LED chips arranged in one or two rows and the visibility of the stop lamp improves, accordingly. Further, according to the above aspect, it is possible to visually recognize the rear through the plurality of openings which are formed in the substrate. Therefore, even if the light emitting area of the stop lamp is large and the stop lamp is arranged on the indoor-side surface of the rear window, rear visibility is not deteriorated but is ensured. Furthermore, according to the above aspect, the plurality of LED chips which are arranged on the substrate are covered with the covering member which is made of a transparent synthetic resin material. Therefore, it is unnecessary to provide a housing and a lens. Compared with the conventional automotive stop lamp which requires the housing (resin molded member) and the lens, the number of parts is decreased and it is possible to greatly reduce manufacturing cost.

Other objects and features of this invention will become apparent from the following description with reference to the accompanying drawings.

DETAILED DESCRIPTIONS

Embodiment(s) of the stop lamp according to the present invention will be explained with reference to the accompanying drawings. It should be noted that the present invention is not limited by this embodiment.

Figure 1:
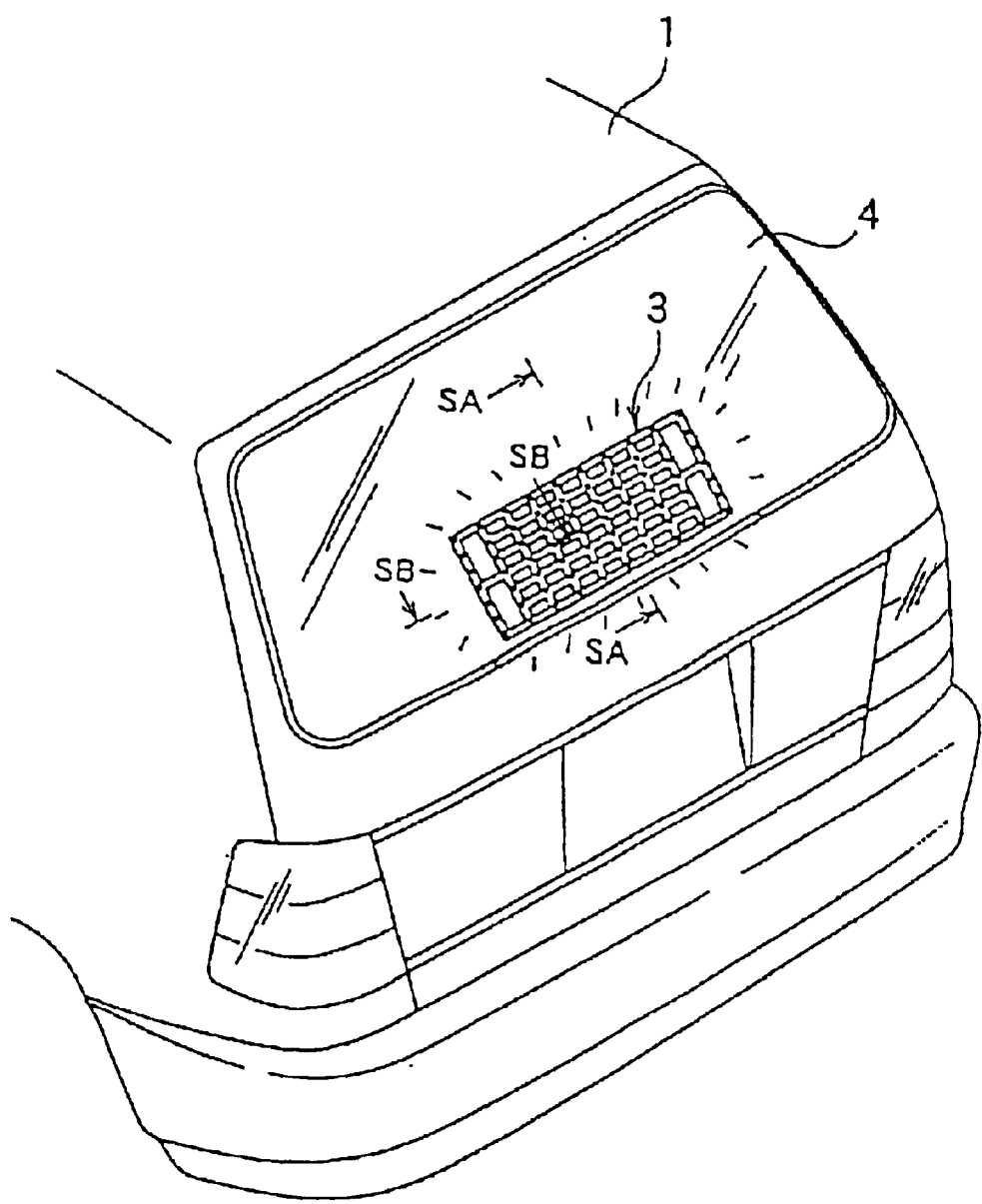
FIG. 1 is a perspective view of a stop lamp according to one embodiment of the present invention.
Figure 2:
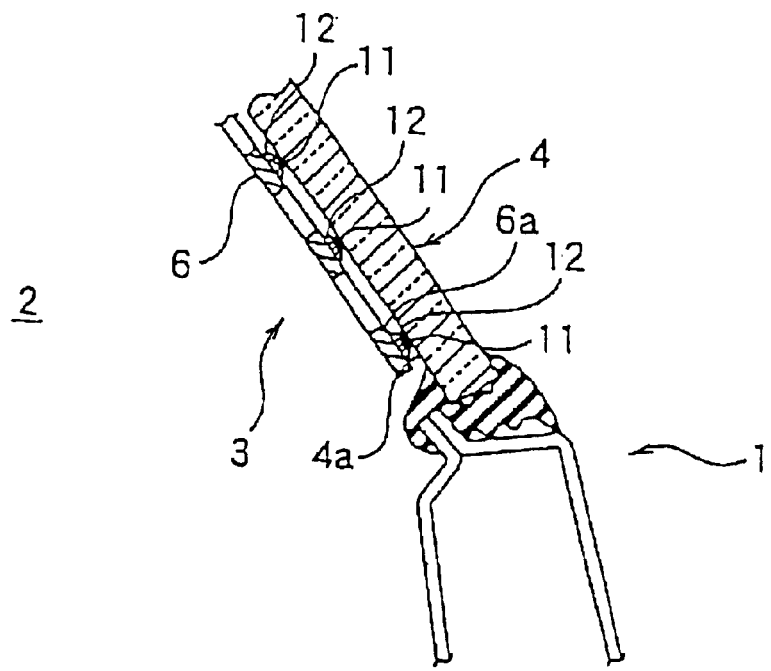
FIG. 2 is a cross-section along the line SA—SA shown in FIG. 1.
Figure 3:
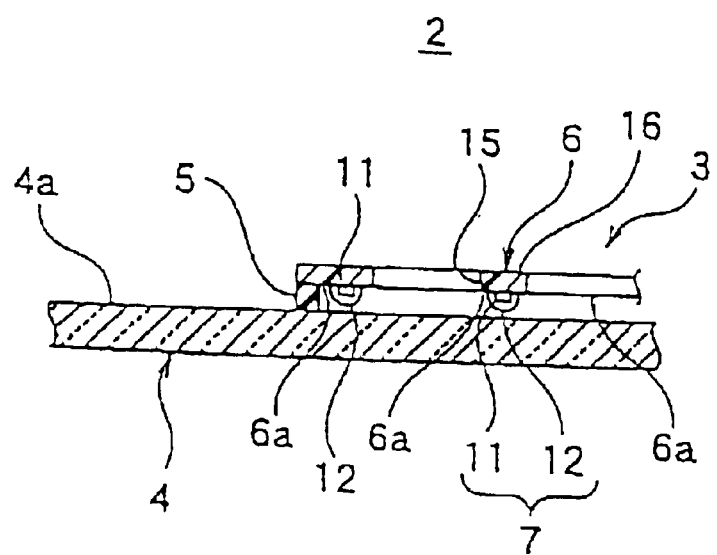
FIG. 3 is a cross-section along the line SB—SB shown in FIG. 1.

FIG. 1 is a perspective view of a stop lamp 3 according to one embodiment of the present invention. FIG. 2 is a cross-section along the line SA—SA shown in FIG. 1. FIG. 3 is a cross-section along the line SB—SB shown in FIG. 1.

The stop lamp 3 consists of a substrate 6 which is directly, fixedly bonded to an inner (with respect to the body of the vehicle 1) surface 4a of a rear window panel 4 by a double-sided adhesive tape 5 (see FIG. 3), and a light emitting unit 7 which is supported by a surface 6a, that faces towards the rear window panel 4, of the substrate 6 (see FIG. 3).

Figure 4:
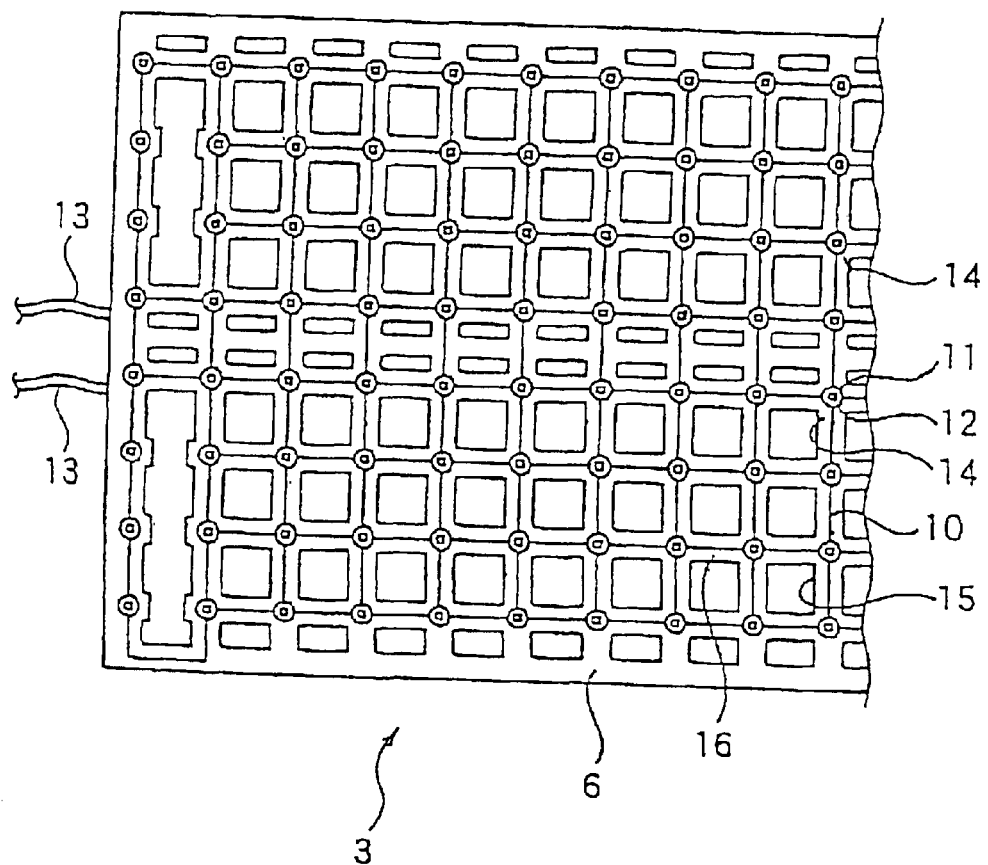
FIG. 4 is a front view of a portion of the stop lamp shown in FIG. 1.

The substrate 6 is made of a three-dimensionally bendable, generally grid-like, flexible thin plate. Namely, the substrate 6 is formed into a thin plate of 0.2 to 0.9 mm (preferably 0.2 to 0.5 mm) and made of flexible glass epoxy resin. A plurality of openings 15 each of 10 mm square are formed an array at a plurality of positions except for the intersections 14 of the substrate 6, respectively. A bridge 16 between the openings 15 is 4 mm wide. The openings 15 may be square openings, rectangular openings as shown in the left of FIG. 4 or an appropriate combination of square openings and rectangular openings. Alternatively, the four corners of the openings 15 around the intersections 14 of the bridge 16 may be notched.

The light emitting unit 7 consists of a plurality of LED chips (light emitting diode chips) 11 which are arranged in an array at the intersections 14 of the outdoor-side surface 6a of the substrate 6, respectively, a conductive wire 10 which is printed on the outdoor-side surface 6a of the substrate 6 and which electrically connects the LED chips 11 to one another, a covering member 12 which covers the LED chips 11 and the substrate 6, which is made of a transparent resin material and which is of dome shape, and a connector (not shown) which is connected to the LED chips 11 through a cord 13.

The substrate 6 is directly, fixedly bonded to the indoor-side surface 4a of the rear window panel 4 by a double-sided adhesive tape 5. The light emitting unit 7 is arranged in proximity to the indoor-side surface 4a of the rear window panel 4. In addition, the conductive wire 10 is electrically connected to a battery (not shown) which serves as a power supply through a stop lamp switch (not shown).

By so constituting, the stop lamp 3 is arranged in an interior 2 of an automobile 1.

The function and advantage of the stop lamp 3, which is constituted as explained above, will next be explained.

The stop lamp switch is turned on by, for example, depressing a brake pedal (not shown). A current is carried to the conductive wire 10, and the LED chips (light emitting diodes) 11 of the light emitting unit 7 are turned on. As a result, it is possible to inform an object outside of the automobile (e.g., a following vehicle) that the brake pedal has been depressed.

In the stop lamp 3, the LED chips 11 are arranged in an array. Therefore, the light emitting area of the stop lamp 3 is larger than that of the conventional automotive stop lamp which has a plurality of LED chips arranged in one or two rows and the visibility of the stop lamp 3 improves, accordingly. In addition, according to the stop lamp 3, rear vision can be monitored through the plurality of openings 15 which are formed in the substrate 6. Therefore, even if the light emitting area is large or the stop lamp is arranged on the indoor-side surface 4a of the rear window panel 4, the rear visibility is not hampered but good rear vision is ensured. Moreover, according to the stop lamp 3, the LED chips 11 which are arranged on the substrate 6 are covered with the covering member 12 which are made of the transparent synthetic resin material. Therefore, it is unnecessary to provide a lamp housing and a lamp lens. Compared with the conventional automotive stop lamp which requires the lamp housing (resin molded member 5, 53) and the lamp lens (lens 12, 58), the number of parts can be decreased and manufacturing cost can be greatly reduced.

Further, it is possible to make the stop lamp 3 thin and light in weight by as much as the decreased number of parts, thereby facilitating the attachment of the stop lamp 3 to the rear window panel 4. Besides, according to the stop lamp 3, the substrate 6 is directly fixed to the rear window panel 4. Therefore, even if the indoor-side surface 4a of the rear window 4 becomes foggy because of dew condensation, the stop lamp 3 is less influenced by the fogging of the rear window 4.

Furthermore, according to the stop lamp 3, the substrate 6 is made of a three-dimensionally bendable, generally grid-like, flexible thin plate. It is, therefore, possible to easily bend the substrate 6 along the indoor-side surface 4a of the rear window panel 4 to have a three-dimensionally bent shape in a plurality of directions. Further, according to the stop lamp 3, because of this flexibility of the substrate 6, even if the substrate 6 is bent, no excessive internal stress is exerted on the substrate 6, ensuring the stable state of the substrate 6. Besides, since the necessary strength of the substrate 6 is maintained, the substrate 6 is not easily broken.

According to the stop lamp 3, the substrate 6 which supports the LED chips 11 can be easily bent to follow up the indoor-side surface 4a of the rear window panel 4. It is, therefore, possible to narrow the space between the indoor-side surface 4a of the rear window panel 4 and the LED chips 11. That is, it is possible to make the stop lamp 3 thin and a wide space is not required on the indoor side of the rear window panel 4. In addition, according to the stop lamp 3, by arranging the LED chips 11 along the indoor-side surface 4a of the rear window panel 4, even if dew condensation occurs to the indoor-side surface 4a of the rear window panel 4, the heat emission of the LED chips 11 can defog the panel 4. As a result, an object outside of the automobile 2 (e.g., a following vehicle) can easily recognize a state in which the stop lamp 3 is turned on, whereby the visibility of the stop lamp 3 improves.

According to the stop lamp 3, the substrate 6 is bent so that the outdoor-side surface 6a of the substrate 6 which supports the LED chips 11 becomes convex. As a result, light emitted from the LED chips 11 is spread greatly than that emitted from a plurality of LED's which are supported by a flat substrate. Therefore, the stop lamp 3 can spread light and ensure a large light emitting area without using a prism spreading unit such as an outer lens, making it easy for the object outside of the automobile (e.g., a following vehicle) to recognize a state in which the stop lamp 3 is turned on. Besides, it is possible to reduce cost by not employing the prism spreading unit such as an outer lens.

Since the substrate 6 is generally grid-like, the stop lamp 3 can be advantageously made light in weight and can advantageously ensure good heat radiation.

According to the stop lamp 3, the LED chips 11 are respectively arranged at the intersections 14 which are lower in deformation degree of the generally grid-like substrate 6. Therefore, even if the substrate 6 is forced to be bent, it is possible to protect the LED chips 11.

According to the stop lamp 3, each of the openings 15 of the substrate 6 is 10 mm square and the width of the bridge 16 between the openings 15 is 4 mm. Therefore, it is possible to easily bend the substrate 6 and to obtain flexibility while maintaining the necessary strength of the substrate 6. In addition, according to the stop lamp 3, since each opening 15 is 10 mm square, good rear vision is ensured while passengers are seated. As explained above, the openings 15 are not necessarily square openings but may be rectangular or the four corners of each opening 15 around the intersections 14 may be notched. It is, therefore, possible to appropriately change the degree of flexibility of the substrate 6, making it possible to further improve the follow-up characteristic of the stop lamp 3 with respect to the shape of the indoor-side surface 4a of the rear window panel 4 and to further improve rear visibility.

According to the stop lamp 3, the thickness of the substrate 6 is 0.2 to 0.9 mm. Therefore, it is possible to obtain flexibility which ensures that the substrate 6 can be easily bent while maintaining the necessary strength of the substrate 6.

According to the stop lamp 3, the substrate 6 is directly fixed to the rear window panel 4 by the double-sided adhesive tape 5. Therefore, the stop lamp 3 can be arbitrarily fixed to any portion of the indoor-side surface 4a of the rear window panel 4 and the degree of freedom of layout can be ensured. Besides, the attachment region can be appropriately selected from the lower end portion of the rear window panel 4 which is located in rear part of a rear seat to the upper end portion of the rear window panel 4, thereby improving the degree of freedom of attachment layout.

According to the stop lamp 3, the covering member 12 is a dome-shaped member. Therefore, the covering member 12 functions as a lens, thereby improving the coefficient of the light utilization of the LED chips 11. According to the stop lamp 3, it is possible to decrease the number of LED chips 11, thereby advantageously simplifying the structure of the stop lamp 3 and advantageously reducing cost. In addition, since the stop lamp 3 does not requires any outer lens, it is possible to make the stop lamp 3 light in weight and thin, accordingly.

Moreover, according to the stop lamp 3, the substrate 6 is made of glass epoxy resin and the plurality of LEDs 11 are made of epoxy resin. Therefore, good adhesion is ensured between the substrate 6 and the LEDs 11. Because of the good adhesion, even if the substrate 6 is bent, it is possible to prevent the LEDs 11 from detaching from the substrate 6.

This embodiment has been explained while employing the substrate 6 which is made of a thin plate that is bendable and flexible along three-dimensions. However, it is also possible to employ a substrate which is made of a thin plate that is bendable and flexible along two-dimensions.

Figure 5A:
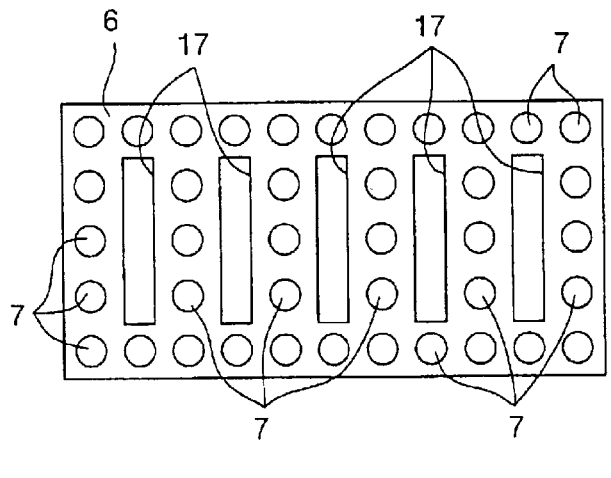
FIG. 5A is a front view of an another example of the stop lamp.
Figure 5B:
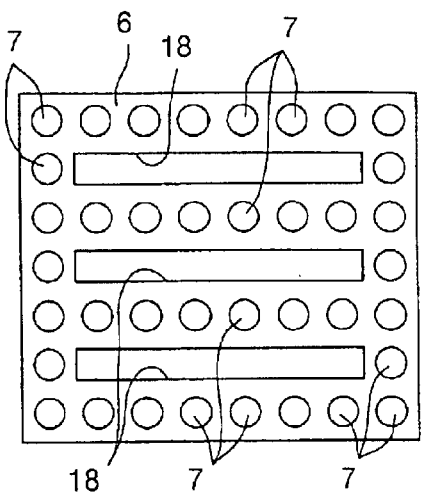
FIG. 5B is a front view of still another example of the stop lamp.
Figure 5C:
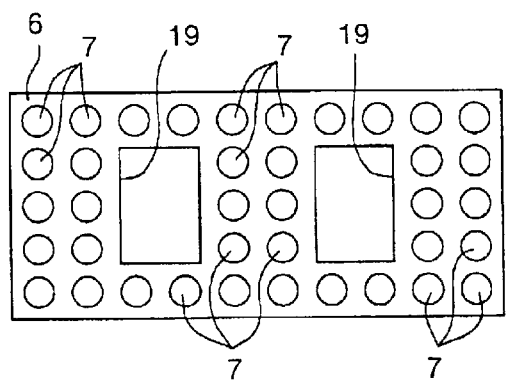
FIG. 5C is a front view of still another example of the stop lamp.
Figure 5D:
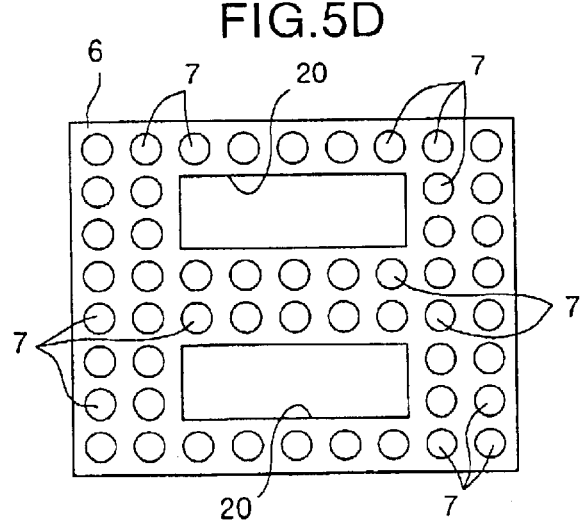
FIG. 5D is a front view of still another example of the stop lamp.

The openings 17 may be provided as shown in FIG. 5A. The openings 18 may be provided as shown in FIG. 5B. The openings 19 maybe provided as shown in FIG. 5C. The openings 20 may be provided as shown in FIG. 5D.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application Serial Number 2001-220539, filed Jul. 19, 2001 and is incorporated herein by reference in its entirety.

What is claimed is:

1. A stop lamp for a vehicle comprising:

a substrate having a plurality of openings passing completely through the substrate, an arrangement for fixing to an inner surface of a panel of a rear window of the vehicle, and a surface that faces towards the panel;

a plurality of LED chips arranged in an array on the surface of the substrate;

at least one connecting wire arranged on the substrate and which electrically connects the LED chips to one another; and a plurality of cover members, each made of transparent synthetic resin and each covering a respective one of the LED chips.

2. The stop lamp according to claim 1, wherein the openings are provided in an array and the substrate is a thin plate that is bendable and flexible along two-dimensions.

3. The stop lamp according to claim 1, wherein the openings are provided in an array, the substrate is a grid-like thin plate that is bendable and flexible along three-dimensions.

4. The stop lamp according to claim 3, wherein each LED chip is arranged at an intersection of the grids.

5. The stop lamp according to claim 1, wherein each of the openings has a length and breadth of ten millimeters, and a width of a bridge between adjacent openings is four millimeters.

6. The stop lamp according to claim 2, wherein a thickness of the substrate is 0.2 to 0.9 millimeters.

7. The stop lamp according to claim 1, wherein the arrangement for fixing to an inner surface of a panel of a rear window is a double-sided adhesive tape.

8. The stop lamp according to claim 1, wherein each of the cover cover members dome shaped.

9. The stop lamp according to claim 1, wherein the substrate is made of glass epoxy resin, and the LED chips are each made of epoxy resin.

10. A stop lamp for a vehicle comprising:

a substrate having a plurality of openings, an arrangement for fixing to an inner surface of a panel of a rear window of the vehicle, and a surface that faces towards the panel, wherein rear visibilty through the openings is provided when the arrangement is fixed to the inner surface of the panel;

a plurality of LED chips arranged in an array on the surface of the substrate; and at least one connecting wire arranged on the substrate and which electrically connects the LED chips to one another.

* * * * *